United States Patent [19]

Nagano

[11] Patent Number: 4,618,332
[45] Date of Patent: Oct. 21, 1986

[54] DERAILLEUR FOR A BICYCLE
[75] Inventor: Masashi Nagano, Izumi, Japan
[73] Assignee: Shimano Industrial Company Limited, Osaka, Japan
[21] Appl. No.: 733,600
[22] Filed: May 13, 1985
[30] Foreign Application Priority Data May 21, 1984 [JP] Japan ............................. 59-74705[U]

[51] Int. Cl.$^4$ ............................................. F16H 9/00
[52] U.S. Cl. ................................... 474/80; 474/82
[58] Field of Search .................................. 474/80, 82

[56] References Cited
U.S. PATENT DOCUMENTS 4,573,951  3/1986  Nagano ............................. 474/80 X Primary Examiner—James A. Leppink
Assistant Examiner—Frank McKenzie
Attorney, Agent, or Firm—Stevens, Davis, Miller & Mosher

[57] ABSTRACT

A bicycle derailleur includes a linkage mechanism formed of a base member, a pair of linkage members, and a movable member having a chain guide. The derailleur also includes a fixture for a control wire to operate the linkage members; and a holder for an outer sheath guiding the control wire. The derailleur is provided with a support member supporting the holder and a guide member which is fixed to the support member at the side thereof as which the control wire is drawn out with respect to the position where the holder is supported. The guide is formed of a material having high wear resistance and a low coefficient of friction. The guide member includes a guide bore so that the wire extending between the exit of the holder and the fixture is adapted to come into contact with the inner surface of the guide bore.

5 Claims, 3 Drawing Figures

DERAILLEUR FOR A BICYCLE

FIELD OF THE INVENTION

This invention relates to a derailleur for a bicycle, and more particularly, to a derailleur which is provided with a linkage mechanism comprising a base member, a pair of linkage members, and a movable member having a chain guide; a fixture for a control wire to operate the linkage mechanism; and a holder for an outer sheath guiding the control wire; so that in operation the control wire is pulled to actuate the chain guide, whereby a driving chain guided therethrough is switched to a selected sprocket of a multistage sprocket assembly for changing the bicycle speed.

BACKGROUND OF THE INVENTION

Generally, bicycle derailleurs are so constructed that the holder for the outer sheath is supported mainly to the base member, the fixture for the control wire is provided at one linkage member or the movable member, and the control wire drawn out of the holder is secured to the fixture. In this configuration the control wire is operated to transform the linkage mechanism so as to move the chain guide in reciprocation axially of the multistage sprocket assembly.

In this case, the control wire moves within the holder and the portion thereof which is drawn out of the holder and secured to the fixture swings laterally following the reciprocation of the chain guide.

Hence, the wire will come into contact with the edge at the exit of the holder to increase its contact resistance, thereby creating the problem in that the speed change efficiency is diminished.

The inventor has hitherto proposed a derailleur as disclosed in Japanese Utility Model Laid-Open Gazetta No. Sho 57-194,886, in which the holder is provided at its exit for the wire with a guide which is formed of a slippery material having a smaller coefficient of friction and which has a guide bore so that the control wire is guided through the guide between the exit of the holder and the fixture, thereby reducing the contact resistance of the wire with respect to the holder.

The guide, which has been formed mainly of synthetic resin, has a problem with wear resistance. Also, the guide, which is fixed to the holder, varies in its position when the holder is adjusted to change its position. As a result, the length of the wire drawn out from the exit at the holder and secured to the fixture also varies. In particular, in a case where a positioning mechanism for the chain guide is provided at the operating lever side, even when the operating lever is operated in a proper range, the amount of movement of the chain guide is not constant. Hence, conjointly with a change in a relative effective length of the wire to the outer sheath caused by wearing of the guide, the speed change efficiency is deteriorated to that extent.

SUMMARY OF THE INVENTION

In order to solve the above problem involving wear between the holder and the fixture in the aforesaid proposed derailleur, this invention has been designed. An object of the invention is to provide a bicycle derailleur which is adapted to reliably guide the wire drawn out of the holder to be secured to the fixture, through a guide bore at a guide regardless of operation of the linkage mechanism, thereby providing superior bicycle speed change efficiency over a long time period.

In other words, this invention is directed to an improvement in a bicycle derailleur which is provided with a linkage mechanism comprising a base member, a pair of linkage members and a movable member having a chain guide; a fixture for the control wire to operate the linkage mechanism; and a holder for an outer sheath guiding the control wire; the fixture being mounted on one of two members movable relative to each other among the four members constituting linkage mechanism, and the holder being mounted on the other of said two members. The derailleur of the invention is provided with a support member having a threaded bore and supporting the holder for the outer sheath through a screw means, and with a guide which is fixed to the support member at a side of the support member at which the control wire is drawn out therefrom with respect to the position at which the holder is supported. The guide also has a guide bore through which the control wire is guided from the exit of the holder for the outer sheath to the fixture for the wire. The guide is formed of a material having a high wear resistance and a low coefficient of friction and is provided with contact means for allowing the wire to contact with the inner surface of the guide bore without coming into contact with the exit edge of the holder.

The guide is formed of a material, such as stainless steel, ceramics, sintered alloy or fluorine-impregnate polyacetal resin, having a high wear resistance and a low coefficient of friction. Hence, the control wire is made slidable reliably for a long time, and the guide is mounted not on the holder but on the support member supporting the holder. Thus, even when the holder is adjusted in its position with respect to the support member, the guide is fixed in position to keep constant a length of the wire between the holder and the fixture at each speed-change stage. Furthermore, even when a positioning mechanism is used for the operating lever, the chain guide is positioned accurately with respect to each position set by the positioning mechanism with respect to each sprocket.

The holder for the outer sheath comprises a tubular shaft having at its center an insertion bore for the wire and at its outer periphery a screw thread. A cup-shaped socket is provided at one end of the tubular shaft. Thus, the tubular shaft screws adjustably with the threaded bore at the support member. The guide bore of the guide has a smaller diameter than that of the insertion bore of the holder and is curved at its inner surface inwardly toward the axis of the guide bore.

Accordingly, the wire is drawn out from the exit of the holder without coming into contact with the exit edge thereof.

Also, when the guide bore has a small diameter, it is preferable to provide at the entrance of the holder a tapered guide surface through which the wire is guided into the guide bore.

The guide is fitted into a receiving bore provided at the support member and then fixed thereto by a fixing means provided mainly by caulking.

In any case, the control wire, when changing the bicycle speed, is guided smoothly in contact with the guide surface at the guide without coming into contact with the exit edge at the holder, thereby enabling the contact resistance of the wire against the holder to be reduced. Furthermore, the guide incurs less wear caused by movement of the wire and has a fixed position, thereby maintaining good speed change efficiency over a long time period. Also, even when the positioning mechanism for the chain guide is provided at the operating lever, a constant movement of the chain guide can be obtained to thereby keep the proper speed-change efficiency over a long time period.

These and other objects of the invention will become more apparent in the detailed description and examples which follow.

DETAILED DESCRIPTION OF THE INVENTION

Figure 1:
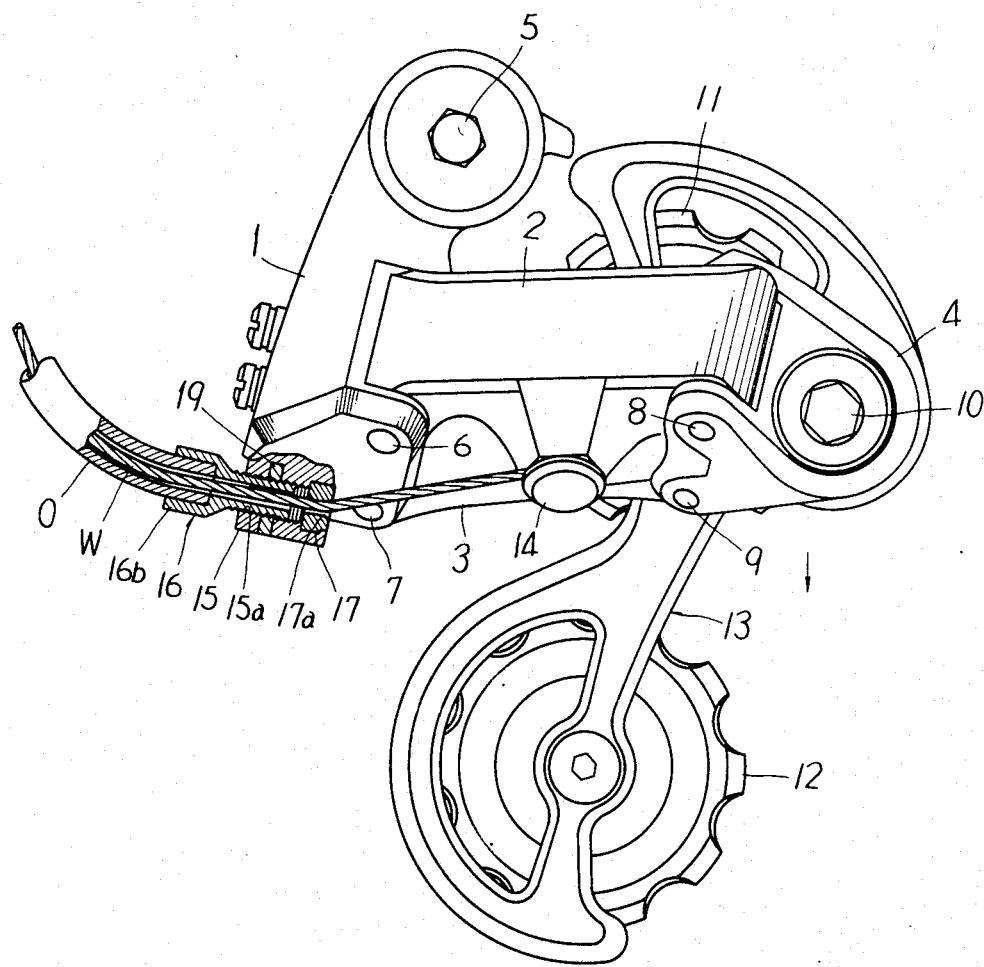
FIG. 1 is a partially cutaway front view of an embodiment of a derailleur of the invention.

A derailleur shown in FIG. 1 is a rear derailleur attached to a multistage sprocket assembly provided at a rear wheel hub of a bicycle. The derailleur basically comprises a linkage mechanism comprising a base member 1, a pair of parallel linkage members 2 and 3, and a movable member 4.

The base member 1 is fixed or pivoted to the rear solid end member of the bicycle frame through a horizontal shaft 5 and has at one side a pair of opposite mounting portions, to which the linkage members 2 and 3 are pivoted through a pair of pins 6 and 7. Movable member 4 is pivoted to the free ends of linkage members 2 and 3 through a pair of pins 8 and 9.

The movable member 4 is shaped like the base member 1 and is provided at one side with mounting arms opposite to each other. Movable member 4 is pivoted at the mounting arms to linkage members 2 and 3 through the pins 8 and 9. At the other side of movable member 4, a chain guide 13 carrying pulleys 11 and 12 is attached to rotate only in a predetermined range through a horizontal shaft 10 extending in parallel to the horizontal shaft 5.

The derailleur constructed as above-mentioned is provided with a return spring (not shown) between the linkage member 2 or 3 and the movable member 4 or base member 1. The return spring biases the chain guide 13 axially of the multistage sprocket assembly (not shown), that is, toward the top or low gear side, but normally to the top gear side. A fixture 14 for a control wire W is provided at the base member 1, linkage member 2 or 3, or movable member 4 (at the linkage member 2 in the drawing). A support member 15 is provided at the other member (the base member 1 in the drawing) and is movable relative to, for example, the linkage member 2 carrying the fixture 14. A holder 16 for an outer sheath O guiding the wire W is provided at the support member 15. The wire W is pulled to transform or actuate the linkage mechanism against the return spring to cause the movable member 4 to move forwardly, and is released to actuate the linkage mechanism by a restoring force applied by the return spring to thereby cause the movable member 4 to move backwardly, thereby switching a driving chaing to a selected sprocket of the multistage sprocket assembly.

Figure 2:
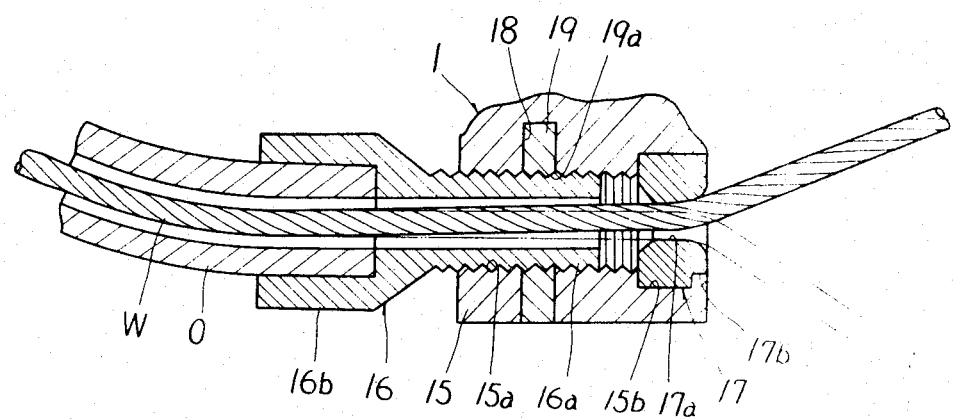
FIG. 2 is an enlarged sectional view of the principal portion of the FIG. 1 embodiment.

The holder 16, a shown in FIG. 2, comprises a tubular shaft 16a, having at its center an insertion bore for the control wire W and at its outer periphery a screw thread, and a cup-shaped socket 16b provided at one end of tubular shaft 16a. Tubular shaft 16a screws with a threaded bore 15a at the support member 15. Holder 16 also includes a cup-shaped socket 16b supporting a terminal of outer sheath O. Fixture 14 secures a terminal of control wire W extending outwardly from the holder 16.

In the embodiment shown in the drawing, the base member 1 is formed of a light metal, such as aluminum, or a synthetic resin, so that it is lightweight. Support member 15 is integral with the base member 1. Guide 17 is formed of a material having a larger wear resistance and a lower coefficient of friction than the material of which base member 1 is formed and has a guide bore 17a. Guide 17 is fixed to the support member 15 at the side thereof at which wire W is drawn out with respect to the holder 16 supporting portion. Wire W which extends from the exit of holder 16 to the fixture 14 is brought into contact with the inner surface of guide bore 17a, thereby preventing the wire W from coming into contact with the exit edge of holder 16.

In the above-described construction, the guide 17 is of a shortened cylindrical shape as shown and is fitted into a bore 15b at the exit of threaded bore 15a such that it is not rotatable nor axially movable. In detail, one or a plurality of recesses 17b are provided at the outer periphery of one end of recess 17b, and after the guide 17 is fitted into the bore 15b, the portions of guide 17 at the outside surface of support member 15 opposite to the recesses 17b are plastically deformed to expand and fill bore 15b, thereby fixing the guide 17 to the support member 15. Also, when the holder 16 is tightened to the end position of tubular shaft 16a, guide 17 is kept in a position where the guide 17 causes no interference with the utmost end of holder 16. In addition, the guide 17 is formed of, for example, stainless steel, but may be formed of a hard material, such as ceramics, sintered metal, or fluorine-impregnate polyacetal resin.

Figure 3:
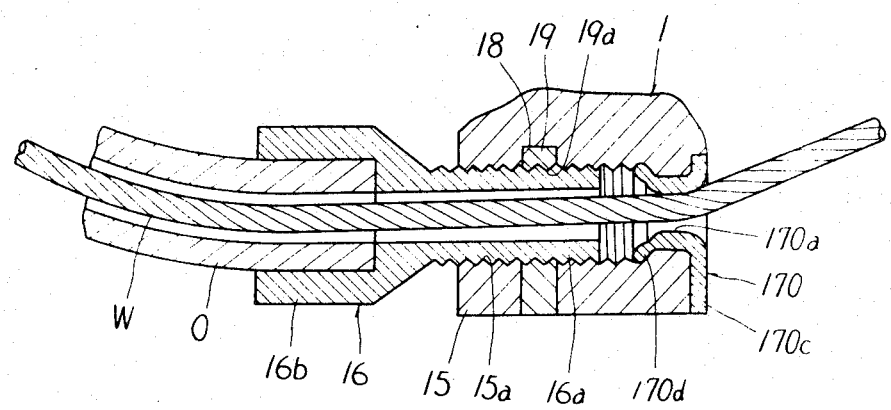
FIG. 3 is an enlarged sectional view of the principal portion of a modified embodiment of the invention.

Also, the guide bore 17a as shown is smaller in diameter than the insertion bore at the holder 16, is curved radially inwardly at its inner surface, and may be round, elliptic or square in section. In brief, the guide bore 17a need only be formed to guide the wire therethrough and does not have a particularly defined shape.

to FIG. 3 represents a modified embodiment of the invention in which a guide 170 is of a shortened cylindrical shape and has at its center a guide bore 170a and at one lengthwise end an outside flange 170c abutting against the outside surface of support member 15 to thereby restrain the guide 170 from moving leftwardly in FIG. 3. Guide 170 also includes a caulking portion 170d at the other lengthwise end of guide 170, which is plastically deformed by a tool to restrain the same from moving rightwardly in FIG. 3, thus fixing the guide 170 to the support member 15.

The support member 15 is provided with a groove 18 traversing the threaded bore 15a and a synthetic resin lock plate 19 which includes a through bore 19a corresponding to the threaded bore 15a. Lock plate 19 is fitted non-rotatably into the groove 18. The tubular shaft 16a at the holder 16 screws with the threaded bore 15a and is inserted through the through bore 19a. The through bore 19a is threaded by the tubular action of shaft 16a being inserted therein and the elasticity of lock plate 19 elastically holds the tubular shaft 16a, thereby preventing the holder 16 from becoming loose.

In addition, the linkage members 2 and 3 and movable member 4 are formed of light metal, such as aluminum, or synthetic resin the same as the base member 1, thereby being reduced in weight.

In FIG. 1, the chain guide 13 is positioned corresponding to the smallest diameter high speed sprocket, i.e., the so-called top gear position. In this condition, the control wire W, when pulled by the control lever, is substantially reduced in length in its extent between the exit of holder 16 and the fixture 14, whereby the linkage members 2 and 3 are forced to swing around the pins 6 and 7. Hence, the movable member 4 moves forwardly toward the low gear side (in the direction of the arrow in FIG. 1) and the fixture 14 moves in the direction of the arrow, following the movable member 4. When the wire W is loosened in this condition, the linkage members 2 and 3 swing by action of the spring force of the return spring, and simultaneously, the movable member 4 moves backwardly and the fixture 14 returns following the movable member 4. At this time the wire W moves in contact with the inner surface of guide bore 17a at the guide 17 so as to avoid contact with the exit edge of holder 16. The guide 17, which is formed of a material having good wear resistance and a low coefficient of friction, allows the wire W to move smoothly with respect to the guide bore 17a and significantly reduces wearing of the inner surface of guide bore 17a. Also, the support member 15 is formed of material having a smaller specific gravity than steel, thereby making the derailleur lightweight as a whole.

Also, since the guide 17 is fixed to the support member 15, even when the holder 16 is adjusted to change its position, the wire W is not changed in the position at which it is drawn out of the guide 17, thereby keeping constant the length of wire W between the guide 17 and the fixture 14 at each speed-change stage. Accordingly, an amount of displacement of chain guide 13 with respect to a stroke of wire W can be made constant. In particular, even when the positioning mechanism is provided at the operating lever, the chain guide 13 is positioned properly with respect to each speed change stage set by the positioning mechanism, thereby enabling improvement in the speed change efficiency to that extent.

Alternatively, the holder 16 may be supported to, for example, the linkage member 3 or movable member 4, to be movable relative to the member carrying the fixture 14.

Also, the fixture 14 may be provided at the base member 1, linkage member 3, or movable member 4.

While various embodiments of the invention have been shown and described, the invention is not limited to the specific construction thereof, which is merely exemplary in the specification rather than defined.

What is claimed is:

1. In a derailleur for a bicycle which is provided with a linkage mechanism comprising a base member, a pair of linkage members each pivotably connected on one end to said base member, and a movable member having a chain guide, said linkage members each being pivotably connected on another end to said movable member; a fixture for a control wire to operate said linkage mechanism; and a holder for an outer sheath for guiding said control wire; said fixture being mounted on one of two members movable relative to each other among said base member, said linkage members and said movable member of said linkage mechanism, and said holder being supported to the other of said two members, the improvement wherein said derailleur further comprises a support member including a threaded bore in which said holder is screwably engaged, and a guide fixed to a side of said support member at which said control wire is drawn out therefrom away from a position at which said holder is supported by said support member, said guide comprising a guide bore for guiding said control wire from an exit of said holder to said fixture when said control wire is actuated, said guide being formed of a material having a relatively high wear resistance and a relatively low coefficient of friction and having means for causing said control wire to avoid contact with an edge of said holder at said exit thereof and to contact said guide bore.

2. A derailleur for a bicycle according to claim 1, wherein said holder comprises a tubular shaft having a central insertion bore for said wire and a screw thread on its outer periphery, said tubular shaft of said holder being screwably engaged with said threaded bore of said support member, said guide bore having a smaller diameter than a diameter of said insertion bore of said tubular shaft such that said wire is adapted to come into contact with an inner surface of said guide bore without coming into contact with said edge at said exit of said holder.

3. A derailleur for a bicycle according to claim 2, wherein said guide comprises a tapered guide surface at an entrance side of said guide bore, said wire being guided through said tapered guide surface to be inserted through said guide bore.

4. A derailleur for a bicycle according to claim 1, wherein said support member comprises a receiving bore at a side of said support member at which said control wire is drawn out away from said position at which said holder is supported by said support member, said receiving bore for receiving therein said guide, said guide being fitted into said receiving bore and fixed thereby by a fixing means.

5. A derailleur for a bicycle according to claim 1, wherein said tubular shaft includes a cup-shaped receiving portion on one end thereof.

* * * * *

REEXAMINATION CERTIFICATE (1066th)
United States Patent [19]
Nagano

[11] B1 4,618,332
[45] Certificate Issued  May 30, 1989

[54] DERAILLEUR FOR A BICYCLE

[75] Inventor: Masashi Nagano, Izumi, Japan

[73] Assignee: Shimano Industrial Company Limited, Osaka, Japan

Reexamination Request:
No. 90/001,656, Nov. 30, 1988

Reexamination Certificate for:
Patent No.: 4,618,332
Issued: Oct. 21, 1986
Appl. No.: 733,600
Filed: May 13, 1985

[30] Foreign Application Priority Data

May 21, 1984 [JP] Japan ............... 59-74705[U]

[51] Int. Cl.⁴ ............................................. F16H 9/00
[52] U.S. Cl. ........................................ 474/80; 474/82
[58] Field of Search ............................... 474/78–82

[56] References Cited

U.S. PATENT DOCUMENTS 4,198,873  4/1980  Nagano et al. ............... 474/82
4,229,987  10/1980  Fujimoto ............... 474/82
4,573,951  3/1986  Nagano ............... 474/80 X

FOREIGN PATENT DOCUMENTS 1794005  8/1959  Fed. Rep. of Germany.
6943513  3/1970  Fed. Rep. of Germany.
738385  10/1955  United Kingdom.

*Primary Examiner*—Thuy M. Bui

[57] ABSTRACT

A bicycle derailleur includes a linkage mechanism formed of a base member, a pair of linkage members, and a movable member having a chain guide. The derailleur also includes a fixture for a control wire to operate the linkage members; and a holder for an outer sheath guiding the control wire. The derailleur is provided with a support member supporting the holder and a guide member which is fixed to the support member at the side thereof as which the control wire is drawn out with respect to the position where the holder is supported. The guide is formed of a material having high wear resistance and a low coefficient of friction. The guide member includes a guide bore so that the wire extending between the exit of the holder and the fixture is adapted to come into contact with the inner surface of the guide bore.

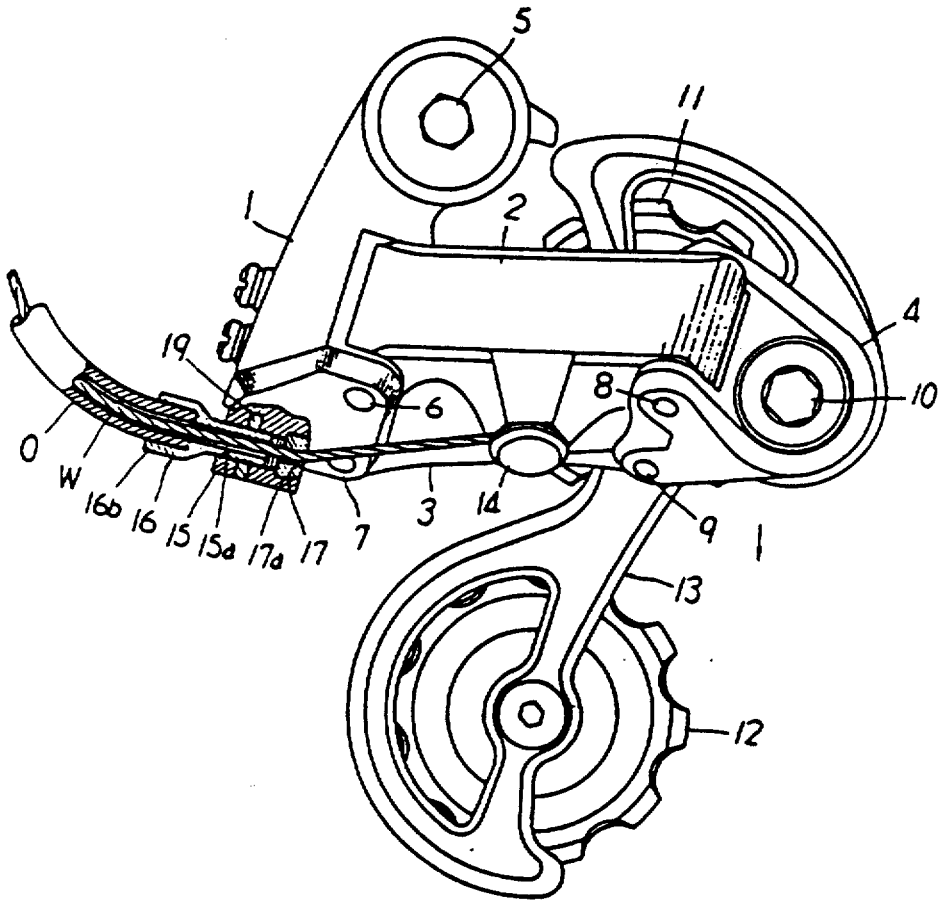

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-5 is confirmed.

New claim 6 is added and determined to be patentable.

*6. A derailleur for a bicycle according to claim 1, wherein said guide material is formed of one of stainless steel, ceramics, sintered metal and fluorine-impregnated polyacetal resin.*